United States Patent [19]

Kim et al.

[11] Patent Number: 5,314,987
[45] Date of Patent: May 24, 1994

[54] BARRIER COMPOSITIONS AND FILM MADE THEREFROM HAVING IMPROVED OPTICAL AND OXYGEN BARRIER PROPERTIES

[75] Inventors: Yong J. Kim; Ray Germonprez, both of Neenah, Wis.

[73] Assignee: American National Can Company, Chicago, Ill.

[21] Appl. No.: 761,490

[22] Filed: Sep. 18, 1991

Related U.S. Application Data

[63] Continuation-in-part of Ser. No. 472,400, Jan. 31, 1990, Pat. No. 5,281,360.

[51] Int. Cl.$^5$ .................. C08G 63/02; C08G 69/44; C08G 73/16
[52] U.S. Cl. .................. 528/289; 252/188.1; 428/423.5; 428/423.7; 502/349; 502/353; 525/425; 525/444; 528/272
[58] Field of Search ............... 525/425, 444; 528/272, 528/289; 428/423.5, 423.7; 252/188.1; 502/349, 353

[56] References Cited

U.S. PATENT DOCUMENTS 4,433,117 2/1984 Takayanagi et al. ............... 525/425
5,021,515 6/1991 Cochran et al. ..................... 525/371

*Primary Examiner*—John Kight, III
*Assistant Examiner*—T. Mosley
*Attorney, Agent, or Firm*—Mary J. Schnurr

[57] ABSTRACT

Novel blends of (i) PET, PBT, CoPET, CoPBT or mixtures thereof with (ii) nylon, wherein component (i) is from a catalyst system based on antimony and germanium, or has virtually no residual cobalt and manganese are disclosed and claimed. These blends have superior barrier properties and clarity. The clarity thereof is further enhanced by adding cobalt octoate to the blend. Articles from such blends are also disclosed and claimed. Novel blends of nylon and cobalt octoate which exhibit superior barrier properties are also disclosed and claimed, as well as articles therefrom. And, multilayer structures and articles therefrom having a core layer of a blend of (i) PET, PBT, CoPET, CoPBT or mixtures thereof, and, (ii) nylon, and optionally (iii) cobalt octoate, are also disclosed and claimed.

7 Claims, No Drawings

BARRIER COMPOSITIONS AND FILM MADE THEREFROM HAVING IMPROVED OPTICAL AND OXYGEN BARRIER PROPERTIES

This application is a continuation-in-part application Ser. No. 07/472,400, filed Jan. 31, 1990 U.S. Pat. No. 5,281,360 entitled, "Improved Barrier Composition and Articles Made Therefrom", incorporated herein by reference. The present invention relates to further improvements in the compositions and articles of application Ser. No. 07/472,400 U.S. Pat. No. 5,281,360.

BACKGROUND OF THE INVENTION

As explained in application Ser. No. 07/472,400, blends of polyethylene terephthalate (PET) and nylon (e.g., MXD6 nylon) with and without cobalt provide oxygen barrier properties superior to most known barrier materials (almost zero permeation).

These blends, however, can be improved, particularly in the areas of optical properties and moisture sensitivity. Blends of PET/MXD6 nylon can have a greenish color and can rapidly lose their superior oxygen barrier properties when the relative humidity (RH) is above 90%. As will be shown hereinafter, these properties are improved by the present invention.

Application Ser. No. 07/472,400 also relates to U.S. Pat. No. 5,281,360 PET/MXD6/PET multilayer structures. As will be shown hereinafter, these structures can exhibit improved barrier properties by the present invention involving the addition of a cobalt compound, such as cobalt octoate to these structures. In particular, by the present invention films of MXD6 with cobalt octoate are a significant improvement in terms of barrier properties over MXD6 films without cobalt.

In addition, reference is also made to U.K. Patent Application GB 2230 530 A, published Oct. 24, 1990 (claiming priority from U.S. Ser. No. 375,957, filed Jul. 6, 1989 abandoned and GB 8901 760, filed Jan. 27, 1989) which relates to an oxidizable polymer which is the condensation polymer product of: (I) $H_2N—R_1—R_2—R_3—NH_2$ (wherein each of $R_1$ and $R_3$ represents a non-aromatic group containing a saturated carbon atom adjacent to the respective $—NH2$ group, and, may be the same or different, and, wherein $R_2$ represents a substituted or unsubstituted arylene group) and (II) $HO_2C—RE_4—R_5—R_6—CO_2H$ (wherein each of $R_4$ and $R_6$ represent a direct bond or a non-aromatic group containing at least one carbon atom, and, may be the same or different, and wherein $R_5$ represents a substituted or unsubsituted arylene group), wherein the molar ratio of (I) to (II) is 1: $X_{II}$ where $X_{II}$ is greater than or equal to 0.05; and, the catalyst for the oxidation of the oxidizable polymer is copper acetate or cobalt acetate.

UK Patent Application GB 2230 530 A fails to disclose or suggest: multilayer structures including a layer of a blend of nylon and a cobalt compound, e.g., A/-blend (e.g. MXD6 nylon and cobalt octoate)/B wherein A and B are from any suitable materials, e.g., PET, PBT or polycarbonate, or the like, and A and B can be the same material or different materials; blends of nylon and a cobalt compound, such as blends of MXD6 and Cobalt octoate; blends of PET, nylon such as MXD6, and a cobalt compound such as cobalt octoate; blends of polybutylene terephthalate (PBT), nylon such as MXD6, and a cobalt compound such as cobalt octoate; blends of PET and/or PBT and nylon (e.g., MXD6); multilayer structures of X/PET and/or PBT and nylon (e.g., MXD6) and cobalt compound (e.g., cobalt octoate)/Y wherein layers X and Y can be the same or different and have moisture resistant properties and preferably comprise PET, PBT or polycarbonate, or the like; or, blends of germanium and antimony catalyst based PET and/or PBT (as opposed to antimony, cobalt, and manganese catalyst based PET), nylon (e.g., MXD6) and a cobalt compound (e.g., cobalt octoate) which exhibit neutralized green or yellow color and/or shortened incubation (aging) period. Accordingly, GB 2230 530 A fails to teach or suggest the present invention.

SUMMARY OF THE INVENTION

The present invention provides blends of germanium and antimony catalyst based PET and/or PBT (or PET and/or PBT containing virtually no residual cobalt and manganese), nylon, e.g., MXD6 nylon, and, a metal complex, especially a cobalt complex, preferably cobalt octoate. Such blends surprisingly exhibit neutralization of the green or yellow color and/or shortening of the incubation or aging period; and, these properties are surprising improvements over the blends of application Ser. No. 07/472,400, U.S. Pat. No. 5,281,360 such that the blends of the present invention are novel and nonobvious improved blends over those of application Ser. No. 07/472,400 U.S. Pat No. 5,281,360. The preferred metal complex, preferably present in an amount 50–300ppm, most preferably 100–150 ppm. The present invention also provides films from the improved blends of the present invention, multilayer films including a layer of the improved blends; and, articles from such films and multilayer films, or from the improved blends.

The present invention also provides nylon blended with a metal complex, especially a cobalt complex, and preferably cobalt octoate, e.g., MXD6 nylon blended with cobalt octoate, such as MXD6 with 50–500 ppm preferably about 100 to 300 ppm cobalt octoate. In this embodiment, multilayer films are contemplated, and, preferred multilayer films are comprised of a first layer, a second layer, and a third layer wherein the second layer is disposed between the first and third layers, the second layer is comprised of the blend of nylon and metal complex (e.g., blend of MXD6 and cobalt octoate). The first and third layers are from any suitable material.

The first and third layers can be from the same material, or from different materials. Suitable materials for the first and third layers include PET, PBT and polycarbonate, with PET being preferred and the structure PET/MXD6 and Co. octoate/PET being preferred. Additional layers may optionally be disposed over either or both of the first and third layers. Articles from the blend, films of the blend, and multilayer structure including a layer of the blend are also contemplated by the present invention.

The present invention further provides multilayer structures comprising a first layer, a second layer, and a third layer, wherein the second layer is disposed between the first and third layers, the second layer is comprised of a blend comprising (i) PET and/or PBT, (ii) nylon, preferably MXD6 nylon, and (iii) a metal complex, preferably a cobalt complex, most preferably cobalt octoate (e.g., 50–300 ppm, preferably 100–150 ppm cobalt octoate); and, the first and third layers are each comprised of a material having moisture resistant properties and can be comprised of the same material or of different materials. PET, PBT and polycarbonate are preferred materials for the first and third layers, especially because of their moisture resistance, optical and thermal properties; other suitable materials for the first and third layers preferably have similar properties. A preferred blend for the second layer is comprised of the aforesaid blend of germanium and antimony catalyst based PET and/or PBT, nylon, e.g., MXD6 nylon, and metal complex, especially cobalt complex, preferably cobalt octoate. Additional, layers may optionally be disposed over the first and/or the third layers. The present invention also contemplates articles from these multilayer structures.

DETAILED DESCRIPTION

Nylon, blends of nylon, and film and multilayer film structures therefrom, particularly those of application Ser. No. 07/472,400, filed Jan. 31, 1990, U.S. Pat. No. 5,281,360 previously incorporated herein by reference, are hereby surprisingly improved with regard to moisture protection, and, clarity and other desirable properties.

In particular, blends of PET and MXD6 nylon, while exhibiting superior oxygen barrier properties, heretofore have had two major areas of improvement, namely, optical or clarity properties and moisture protection. For instance, it has been observed that blends of Eastman PET 9663 resin and Mitsubishi Gas Chemical MXD6 6001 nylon have a greenish color. The greenish color is believed to be inherent. The extent of this greenish color is also believed to be related to the MXD6 nylon content. Also, it takes about 3 to 4 weeks incubation time (or aging) at about 50% RH to attain reasonably good oxygen barrier properties from such blends (particularly, less than about or equal to about 1.0 cc/mil/m$^2$/day). Adding metal complexes, especially a cobalt complex, and preferably cobalt octoate to such blends shortens the aging to a few days but, causes the green color to be even more pronounced or to darken. Thus, blends of Eastman PET 9663 resin, MXD6 and cobalt octoate exhibit major appearance problems. Such blends have a dark greenish color, and products therefrom exhibit the same coloring. This is detrimental when transparent products, e.g., clear bottles, are desired.

It has surprisingly been found that the inherent greenish color of the aforesaid PET and nylon, and PET, nylon and cobalt complex blends can be neutralized, or that such blends can have improved clarity, by employing in such blends PET produced from a catalyst system based on germanium and antimony or having virtually no residual magananese and cobalt, as opposed to PET produced from a catalyst system based on antimony, cobalt and manganese. It has been also surprisingly discovered that the incubation or aging time of such blends of PET and nylon can be shortened, and, the color even further neutralized, by the addition to such PET and nylon blends of a metal complex, especially a cobalt complex, and preferably, cobalt octoate.

Eastman PET 9663 resin is PET from a catalyst system based upon antimony, cobalt, and manganese. Japanese Unipet 543 PET resin is a PET from a catalyst system based upon germanium and antimony. In the case of Unipet 543, residual catalysts left in the resin are typically approximately: germanium: 8 ppm, antimony: 4 ppm, cobalt and manganese: less than 0.1 ppm. In Eastman PET 9663 resin, the residual catalysis in the resin are typically approximately: antimony: 95 ppm, cobalt and manganese: 62 ppm, and, no germanium.

When Unipet 543 is blended with MXD6 nylon, the resultant blend is yellowish in color, i.e., has improved clarity or a neutralized color.

Without wishing to be bound by any one particular theory, it seems that PET from a catalyst system based upon germanium and antimony, or PET with virtually no residual cobalt and manganese (wherein "virtually no" means less than 0.1 ppm), when blended with MXD6 nylon, provides blends with improved clarity or neutralized color (yellowish color, rather than dark green color). Such blends of MXD6 with PET from a catalyst system based upon germanium and antimony, or with PET with virtually no residual cobalt and manganese exhibit oxygen barrier properties and requires incubation similar to the aforesaid blends of Eastman PET 9663 resin and MXD6. These blends of nylon and PET from a catalyst system based upon germanium and cobalt or PET with virtually no residual cobalt and manganese may hereinafter be called "a/g - PET" blends.

It has been even further surprisingly found that the gradual addition of a sufficient quantity of a metal complex, especially a cobalt complex, preferably cobalt octoate, to blends of MXD6 and PET from a catalyst system based on germanium and antimony, or PET with virtually no residual cobalt and manganese, i.e., to a/g - PET blends, causes the yellowish color of the blend to be neutralized. A broad range for the amount of cobalt octoate to be added to such blends is 50 to 300 ppm. However, it has been observed that when the amount of added cobalt octoate exceeds about 150 ppm, the blue color of the cobalt octoate begins to dominate the color of the blend. Accordingly, about 150 ppm is a presently preferred maximum amount of cobalt octoate in the blends of this invention, with 100-150 ppm being a preferred range. When 100-150 ppm of cobalt octoate is added to the blends of MXD6 and antimony/germanium based or virtually no residual manganese and cobalt PET of this invention, the resultant blend requires incubation of only a few days. Therefore, a/g-PET blends having the cobalt octoate added thereto are presently preferred.

In sum, the preferred blends of MXD6 nylon, antimony/germanium based or virtually no residual manganese and cobalt PET (such PET shall hereinafter be called "a/g - PET") and cobalt octoate (100-150 ppm) exhibit the following novel and nonobvious properties (which thereby render the blends novel and nonobvious): (i) neutralization of green or yellow color, i.e., improved clarity and neutralized color; and (ii) shortened incubation (aging) period. In such a/g-PET blends, copolymers of antimony/germanium based or virtually no residual manganese and cobalt PET (hereinafter "a/g-CoPET"), PBT from an antimony and germanium based catalyst system or PBT having virtually no residual manganese and cobalt ("hereinafter a/g-PBT"), or copolymers of such PBT (hereinafter "a/g-CoPBT"), or blends of a/g-PBT and/or a/g-CoPBT and/or a/g-PET and/or a/g-CoPET (i.e., blends containing at least any two of a/g-PBT, a/g-CoPBT, a/g-PET and a/g-CoPET) may be substituted for the a/g-PET in the novel blends of this invention.

However, a film from a blend of PET and nylon or of PET, nylon and cobalt octoate, while exhibiting outstanding oxygen barrier properties, tends to lose these properties rapidly when the relative humidity is above 90% RH.

It has been surprisingly found that a nearly 100% increase in oxygen barrier properties can be achieved at 100% RH by employing the blend layer as a core layer in a multilayer film wherein the outer layers are comprised of materials which have moisture resistance properties. That is, it has surprisingly been found that a multilayer film which comprises at least three layers, i.e., a first layer, a second layer and a third layer, wherein the second layer is a core layer disposed between the first and third layers and wherein the second layer is comprised of a blend comprising PET and MXD6 nylon, or PET, MXD6 nylon and a cobalt complex, preferably cobalt octoate, and, each of the first and third layers are comprised of a moisture resistant material, exhibits improved barrier properties at 100% RH in comparison to a single layer film of just the blend. And, this improvement can be nearly 100% increase in barrier protection at 100% RH. In this embodiment, the first and third layers can be from any suitable material and can be from the same material or from different materials. Suitable materials for the first and third layers include PET, CoPET, PBT, CoPBT, blends thereof and polycarbonate; PET is presently preferred. PBT, co-PBT, co-PET and blends thereof with or without PET can be substituted for the PET in the core blend layer. In the multilayer films of this invention the core layer can be any suitable thickness, but, when it is only about 10% of the multilayer film, the greenish color of the blend has little effect on the color of the multilayer film such that the multilayer film also exhibits improved clarity over a film of the lend alone. Furthermore, the earlier described a/g-PET blends and preferred a/g-PET blends (e.g. a/g-PET blends containing 100-150 ppm cobalt octoate) are also preferred for the core blend layer so that the multilayer structure exhibits not only improved barrier properties at elevated RH, but also, even greater improvements in clarity (neutralized green or yellow color), and, shortened aging. Note that it is herein stated that the multilayer film comprises at least three layers because an additional layer or additional layers may be added over either or both of the first and third layers. These additional layers may be of any suitable material.

As a further improvement, it has been surprisingly discovered that the addition of metal complexes, especially cobalt complexes, preferably cobalt octoate to nylon, e.g., MXD6 nylon, results in a 4 to 5 times increase in oxygen barrier properties of the nylon. The nylon blended with cobalt octoate is preferably employed as a core layer of an at least three layer multilayer film wherein the outer layers can be of any suitable material. The outer layers of such a multilayer film can be of the same material or of different materials. Preferred materials for the outer layers include PET, CoPET, PBT, CoPBT, blends thereof and polycarbonate; PET is presently preferred. Again, at least three layers are specified for the multilayer structure because an additional layer or additional layers may be disposed over the above-described outer layers of this embodiment. Such additional layers can be of any suitable material. However, two-layer films preferably employing one of the above-described outer layers (of the at least three-layer embodiment) and the nylon blended with cobalt octoate are also contemplated.

When additional layers have been mentioned herein, such additional layers can be from almost any materials conventionally used in the art, e.g., metal foil, vinylidene chloride copolymers, polyethylene (PE), medium density polyethylene (MDPE), high density polyethylene (HDPE), low density polyethylene (LDPE), linear low density polyethylene (LLDPE), very low density polyethylene (VLDPE), polypropylene (PP), ultra linear low density polyethylene (ULDPE), propylene ethylene copolymer (PPE), MXD6, nylon, high impact polystyrene (HIPS), ethylene vinyl alcohol copolymer (EVOH), ethylene butene copolymers (EB), polyethylene terephthalate (PET), polybutylene terephthalate (PBT), copolymers of PET or of PBT or CoPET or CoPBT, ethylene vinyl acetate copolymer (EVA) (e.g., a high VA content EVA, i.e., about 28-35% by weight VA EVA such as Exxon LD-761) or, inks, primers or ionomer resins, e.g., Surlyn (Du Pont), or the like, or mixtures thereof.

In multilayer films, structures or laminates, a tie or an adhesive may also be present between the layers. Suitable materials for such tie layers or adhesives are known to the ordinary skilled artisan and may include, by way of example, anhydride modified polyolefins, (e.g., graft copolymer of maleic anhydride and propylene wherein maleic anhydride moieties are grafted onto polypropylene chains) ethylene acrylic acid copolymers, ethylene methyl acrylate copolymers, blends or copolymers of PP and EVA, or other synthetic resinous materials. The selected adhesive should be stable under the condition by which the multilayer structures or articles therefrom of the invention are prepared or used. For additional information on adhesives, reference is made to commonly owned U.S. patent application Ser. No. 07/458,489, filed Dec. 28, 1989 above. Commercially available products for additional layers in products of the invention include nylon 6; 11; 6, 12; and 6, 66; ULTRAMIDKR 4600 (BASF), NOVAMID 2030 (Mitsubishi Chem. Co.), DURATHANE (Farbenfabriken Bayer A. G.), "1030"(Unitika, Japan), SYTEL SUPERTUFF 811 (DuPont), "4018"(Huels, Germany), and ELY 1256 (Elmser, Switzerland), Mylar, Dalar, Exxon 5610A-2 (blend of PP containing EVA), Admer (Mitsui, No. AT469C), Bynel (DuPont E361 or 3036), Plexar 3342, and Surlyn. Admer, Bynel and Plexar are believed to be maleic anhydride modified polyolefins.

Throughout this specification, reference has been or will be made to multilayer structures, films, film structures, sheets or laminates. These multilayer or film structures, films or laminates are the same thickness as conventional multilayer structures, films, film structures, sheets or laminates. Typical thicknesses of films and film structures can range from about 2.0 mils (0.051 mm) to 5 mils or more, with a normal range of about 0.5 to about 5.0 mils, preferably about 1.5 to about 3.0 mils (0.038-0.076 mm). Films thinner than about 1.5 mils (0.038 mm) may be too weak to perform their required function (although individual layers of multilayer structures may be thinner than about 1.5 mils, e.g., about 0.25 to about 1 mil). Laminates can be up to 10 mils thick and multilayer structures can include films (even single layer films); film structures and laminates can be up to 100 mils thick. "Structure" includes multilayer structure as used herein. A container such as a bottle, e.g., from a multilayer structure, can have an average thickness of about 30 mils.

Films from blends of the present invention, e.g., single layer films, and multilayer films or structures including layer of a blend of the present invention can be formed by any of the conventional processes for making films and multilayer films, including laminations, extrusions, coextrusion, blown extrusion, tubular water quench extrusion, extrusion coating, and the like, and combinations thereof. Extrusion is presently preferred for forming single layer films and coextrusion for forming multilayer films. Likewise, blends of the present invention, films from blends of the present invention, e.g., single layer films and multilayer films or structures including a layer of a blend of the present invention, can be formed into useful articles such as packages, e.g., pouches, containers, bottles and the like by conventional processes for making such articles, including blow molding, extrusion blow molding, injection blow molding, stretch blow molding, and the like.

The following non-limiting examples are given by way of illustration only and are not intended to be considered a limitation of this invention; many apparent variations of which are possible without departing from the spirit or scope thereof.

EXAMPLES

Example 1

Advantages of a/g-PET in blends of PET and nylon and in blends of PET, nylon and metal complex.

Blend A: Eastman PET 9663, having residual catalyst of: antimony: 95 ppm, cobalt and manganese: 62 ppm, and no germanium, was blended with Mitsubishi Gas Chemical MXD6 6001 nylon such that in the blend there was 92.5 weight percent PET and 7.5 weight percent MXD6. This blend had a green color.

Blend B: Japanese Unipet 543 PET resin having residual catalyst of: germanium: 8 ppm, antimony: 4 ppm, and, cobalt and manganese: less than 0.1 ppm, was blended with Mitsubishi Gas Chemical MXD6 6001 nylon such that in the blend there was 92.5 weight percent PET and 7.5 weight percent MXD6. The blend has a yellowish color.

Blend C: Blend A having cobalt octoate added thereto at amounts of 100 (Blend C1) and 150 ppm (Blend C2). The blends had a pronounced green color, i.e., darker than that of Blend A, with Blend C2 appearing darker than Blend C1.

Blend D: Blend B with the gradual addition of cobalt octoate, at amounts of 50 (Blend D1), 100 (Blend D2), 150 (Blend D3) 200 (Blend D4) and 300 ppm (Blend D5). Blend D1 appeared to have improved clarity over blend B, i.e., the yellow color appeared somewhat neutralized. Blend D2 appeared to have improved clarity over blend D1, i.e., the yellowish color appeared to be mostly neutralized. In Blend D3 the yellowish color of blend B appeared to be very neutralized. Blend D4 appeared to have a bluish hue; and, blend D5 was a bluish color.

Single layer film (approx. 27-28 mils thick) of blends A, B, C1, C2, D2 and D3 were tested for oxygen permeability (barrier properties) after 3 days, 5 days, 3 weeks and 4 weeks incubation time (or aging) at about 50% RH. Films from blends A and B required 3 to 4 weeks to achieve good barrier properties of about less than or equal to 1.0 cc/mil/m²/day. Films C1, C2, D2 and D3 required only 3 to 5 days to achieve good barrier properties of about less than or equal to 1.0 cc/mil/m²/day. Thus, blends of a/g - PET and nylon surprisingly, exhibit improved clarity, and, blend of a/g - PET, nylon and cobalt octoate surprisingly exhibit neutralized color (i.e., neutralization of green or yellow color), and, shortened incubation (aging period).

Example 2

Advantages of multilayer films. Single layer and multilayer films were formed into ketchup bottles on a Nissei stretch blow molding machine. The bottles had an average thickness of about 27-28 mils. The bottles had the structures set forth below in TABLE 1; and, the bottles were tested for oxygen permeation at 0% RH and 100% RH, and, the results thereof are set forth in TABLE 1.

TABLE 1

| OXYGEN PERMEATION (cc/mil/m² day)* AFTER 3 MONTHS AGING | | |
|---|---|---|
| STRUCTURES | 0% RH | 100% RH |
| (A) PET + 7.5% MXD6 (single layer)** | 1 | 58 |
| (B) PET + 7.5% MXD6 + Co (single layer)*** | 0 | 101 |
| (C) PET/PET + 7.5% MXD6/PET**** (10%: Core) | — | 125 |
| (D) PET/PET + 7.5% MXD6 + Co/PET***** (10%: core) | 4.8 | 61 |
| (E) PET (single layer, control) | 126 | 115 |

*Oxygen data was normalized by total thickness, not by barrier layer thickness.
**PET is not a/g-PET, color of bottle is green.
***"Co" means cobalt octoate added to blend (100 ppm); PET is not a/g - PET. Color of bottle is dark green.
****Multilayer structure wherein the blend (PET is not a/g - PET) is the core layer; the outer layers are both PET; and, the core was 10% of the overall thickness of the structure. The dash means data not obtained. The bottle was substantially transparent.
*****Multilayer structure wherein the blend (PET is not a/g -PET) is the core layer; "Co" (cobalt octoate) was added to the blend (100 ppm); the outer layers are both PET; and, the core was 10% of the overall thickness of the structure. The bottle was substantially transparent.

Table 1 shows that blends of nylon and PET and of nylon, PET and cobalt octoate lose some of their excellent barrier properties in high humidity (RH greater than 90%) conditions; but, these blends can be protected from moisture by employing them as a core layer in a multilayer structure. Table 1 further shows that by employing blends of nylon, PET and cobalt octoate as the core layer of an at least three layer structure wherein the outer layers are comprised of materials having moisture resistant properties, e.g., PET, Co-PET, PBT, CoPBT, mixtures thereof, or polycarbonate, the oxygen barrier properties of the resultant structure, in high humidity conditions, are improved. Indeed, comparing the oxygen permeation at 100% of structures B and D, it is apparent that the multilayer structure of the present invention exhibits nearly a 100% (or two-fold) increase in barrier properties. While structure C shows a two times increase in oxygen permeation when compared to structure A, it must be kept in mind that the oxygen data was generated by being normalized by total thickness; the protective layers have a very significant impact on the barrier. Furthermore, improved optical properties (substantially transparent or translucent) of the 3-layers bottles is due to the fact that the blend layer is only 10% of the total structure; and, the protective outer layers are transparent. The use of a/g - PET in the blends of the 3-layer bottles produces bottles having significantly better optical properties than both the single layer bottles and the 3-layers bottles from PET which is not a/g-PET. The effects of a/g-PET, and blends thereof certaining cobalt octoate enhance the optical properties of the 3-layer bottles. Use of blends of nylon and PET or nylon, PET and cobalt octoate as the core layer of multilayer structures of the present invention wherein the core layer is only about 10% of the total structure and the PET is not a/g - PET, nonetheless provides improved oxygen barrier properties at high humidity and improved optical properties because such bottles exhibit the barrier properties of structures C and D, above, and are translucent or nearly transparent.

It is preferred that blends employing a/g - PET, e.g., blends B, D1, D2 and D3 of Example 1, be employed as the core layer of multilayer structures of the present invention so that resultant articles therefrom (such as bottles) exhibit significantly improved clarity including transparency.

Example 3

Superior barrier properties of films containing MXD6 nylon blended with cobalt octoate. 3-layer bottles of PET/MXD6/PET and PET/MXD6 & Cobalt Octoate/PET were produced on a Nissei stretch blow molding machine. These bottles were tested for oxygen permeation. The results are set forth in Table 2.

Cast films of MXD6 and MXD6 blended with cobalt octoate of thicknesses varying from 5 to 35 mils were also tested for oxygen permeation. These results are also set forth in TABLE 3.

TABLE 2

| Structures | Thickness (mils) | Oxygen Permeation (cc/mil/$m^2$ day)* after 3-month aging (0% RH) |
|---|---|---|
| (A) PET/MXD6/PET** | 27 | 42 |
| (B) PET/MXD6 + 100 ppm Co/PET*** | 28 | 9 |

*Oxygen barrier data was normalized by total thickness, not by barrier layer thickness
**Core layer is 10% of thickness of film
***"Co" means cobalt octoate; core layer is 10% of thickness of film.

TABLE 3

| | Thickness (mils) | Oxygen permaeation (cc/mil/$m^2$ days) (green cast film at 0% RH)* | | | | |
|---|---|---|---|---|---|---|
| Variables | | 36(hrs) | 84 | 180 | 276 | 324 |
| (C) MXD6 Film | 5 | 17 | 15 | 5 | 11 | 12 |
| (D) MXD6 Film | 9 | 15 | 13 | 9 | — | — |
| (E) MXD6 Film | 19 | 30 | 12 | 12 | — | — |
| (F) MXD6 Film | 32 | 93 | 38 | 13 | 7 | 12 |
| (G) MXD6 Film + 300 ppm Co | 5 | 8 | 3 | 1 | 0.3 | 0.5 |
| (H) MXD6 Film + 300 ppm Co | 11 | — | 0 | — | — | |
| (I) MXD6 Film + 300 ppm Co | 19 | 23 | 1 | 0 | — | — |
| (J) MXD6 Film + 300 ppm Co | 35 | 39 | 0 | 0 | — | — |

*Dash means data not obtained.

The data of TABLES 2 and 3 show that additions of cobalt octoate to MXD6 nylon significantly improves the oxygen barrier properties of films therefrom, thereby making such blended MXD6 nylon films more impervious to oxygen than MXD6 nylon films which do not contain cobalt octoate. TABLE 2 shows a 4 to 5fold increase in oxygen barrier properties of a film having a core layer of MXD6 blended with cobalt octoate. Thus, the data of TABLE 2 shows a 4 to 5 fold increase in oxygen barrier properties of MXD6 blended with cobalt octoate. Similar results were obtained with the cast films of MXD6 blended with cobalt octoate as shown by TABLE 3. Accordingly, additions of cobalt octoate to MXD6 nylon surprisingly provides the advantage of significant improvements of the oxygen barrier properties of the MXD6 nylon.

Having thus described in detail preferred embodiments of the present invention, it is to be understood that the invention defined by the appended claims is not to be limited by particular details set forth in the above description as many apparent variations thereof are possible without departing from the spirit or scope of the present invention.

What is claimed is:

1. A composition comprising a blend of (i) polyethylene terephthalate, polybutylene terephthalate, copolymers of polyethylene terephthalate, copolymers of polybutylene terephthalate or mixtures thereof, and (ii) nylon, wherein, component (i) is from a catalyst system based upon antimony and germanium, and having less than 0.1 ppm residual cobalt and manganese.

2. The composition of claim 1 wherein component (i) comprises polyethylene terephthalate and component (ii) comprises MXD6 nylon.

3. The composition of claim 2 wherein the blend further comprises (iii) a cobalt complex.

4. The composition of claim 3 wherein the cobalt complex comprises cobalt octoate.

5. The composition of claim 4 wherein the cobalt octoate is present in an amount of 100–150 ppm.

6. A film from or including as a layer thereof the composition claim 5.

7. A composition comprising a blend of (i) polyethylene terephthalate, polybutylene terephthalate, copolymers of polyethylene terephthalate, copolymers of polybutylene terephthalate or mixtures thereof, and (ii) nylon, wherein, component (i) is from a catalyst system wherein the catalyst is selected from the group consisting essentially of antimony and germanium and said component having less than 0.1 ppm residual cobalt and manganese.

* * * * *